US009086920B2

(12) United States Patent
David et al.

(10) Patent No.: US 9,086,920 B2
(45) Date of Patent: Jul. 21, 2015

(54) DEVICE FOR MANAGING DATA BUFFERS IN A MEMORY SPACE DIVIDED INTO A PLURALITY OF MEMORY ELEMENTS

(75) Inventors: Raphael David, Bures sur Yvette (FR); Nicolas Ventroux, Bures sur Yvette (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 466 days.

(21) Appl. No.: 13/125,583

(22) PCT Filed: Oct. 20, 2009

(86) PCT No.: PCT/EP2009/063715
§ 371 (c)(1),
(2), (4) Date: Jun. 8, 2011

(87) PCT Pub. No.: WO2010/046355
PCT Pub. Date: Apr. 29, 2010

(65) Prior Publication Data
US 2011/0307677 A1   Dec. 15, 2011

(30) Foreign Application Priority Data

Oct. 24, 2008   (FR) ...................................... 08 05926

(51) Int. Cl.
*G06F 12/02* (2006.01)
*G06F 9/50* (2006.01)
(Continued)

(52) U.S. Cl.
CPC ............ *G06F 9/5016* (2013.01); *G06F 12/023* (2013.01); *G06F 12/1458* (2013.01); *G06F 13/1657* (2013.01)

(58) Field of Classification Search
CPC ..... G06F 21/79; G06F 21/80; G06F 12/1441; G06F 12/1433; G06F 12/1491; G06F 9/5016; G06F 12/023
USPC ......................................................... 711/163
See application file for complete search history.

(56) References Cited

U.S. PATENT DOCUMENTS 5,784,698 A * 7/1998 Brady et al. .................. 711/171
6,175,900 B1 * 1/2001 Forin et al. ................... 711/156
(Continued)

FOREIGN PATENT DOCUMENTS

EP     0 294 499 A    12/1988

OTHER PUBLICATIONS

Renaud Lottiaux and Christine Morin: "A Cluster Operating System Based on Software COMA Memory Management," Proceedings 2nd Workshop on Software Distributed Shared Memory (WSDSM 2000), [Online] May 2000, pp. 1-7, XP002534061.
Jegou Y: "Implementation of page management in mome, a user-level DSM," Cluster Computing and the Grid, 2003 Proceedings. CCGRID 2003. 3rd IE EE/ACM International Symposium on May 12-15, 2003, Piscataway, NJ, USA, IEEE, May 12, 2003, pp. 479-486, XPOI0639788.
(Continued)

*Primary Examiner* — Charles Rones
*Assistant Examiner* — Andrew Russell
(74) *Attorney, Agent, or Firm* — Baker & Hostetler LLP

(57) ABSTRACT

In a device for managing data buffers in a memory space distributed over a plurality of memory elements, the memory space is allocatable by memory pages, each buffer including one or more memory pages. The buffers are usable by at least one processing unit for the execution of an application, the application being executed by a plurality of processing units executing tasks in parallel. The memory elements are accessible in parallel by the processing units. The device includes means for allocating buffers to the tasks during the execution of the application and means for managing access rights to the buffers. The means for managing the access rights to the buffers include means for managing access rights to the pages in a given buffer, to verify that writing to a given page does not modify data currently being read from the page or that reading from a given page does not access data currently being written to the page, in such a way as to share the buffer between unsynchronized tasks.

16 Claims, 12 Drawing Sheets

(51) Int. Cl.
 *G06F 13/16* (2006.01)
 *G06F 12/14* (2006.01)

(56) References Cited

U.S. PATENT DOCUMENTS

| | | | |
|---|---|---|---|
| 6,308,248 B1 * | 10/2001 | Welker et al. | 711/209 |
| 6,374,340 B1 * | 4/2002 | Lanus et al. | 711/173 |
| 2004/0049600 A1 | 3/2004 | Boyd et al. | |
| 2008/0104086 A1 * | 5/2008 | Bare et al. | 707/100 |
| 2009/0228673 A1 * | 9/2009 | Waters et al. | 711/163 |

OTHER PUBLICATIONS

Shalan, M. A.: "Dynamic Memory Management for Embedded Real-Time Multiprocessor System on a Chip," Ph.D Thesis, Georgia Institute of Technology, Nov. 2003, pp. 1-104.

Chen, J., et al.: "Page-Based Non-Contiguous Dynamic Memory Allocator," Institute of Microelectronics and Optoelectronics, Zhejiang University Hangzhou Zhejiang, Undated, pp. 1-9.

\* cited by examiner

DEVICE FOR MANAGING DATA BUFFERS IN A MEMORY SPACE DIVIDED INTO A PLURALITY OF MEMORY ELEMENTS

CROSS-REFERENCE TO RELATED APPLICATIONS

This application is a National Stage of International patent application PCT/EP2009/063715, filed on Oct. 20, 2009, which claims priority to foreign French patent application No. FR 08 05926, filed on Oct. 24, 2008, the disclosures of which are incorporated by reference in their entirety.

FIELD OF THE INVENTION

The present invention relates to a device for managing data buffers in a memory space distributed over a plurality of memory elements. It is applied for example in the field of embedded systems with high computational power.

BACKGROUND OF THE INVENTION

Current embedded systems are tending to implement ever more complex processings. By way of example, cell phones must implement complete telecommunication facilities. Onboard video-surveillance devices must implement complete facilities for image processing. In parallel with this increase in the complexity of applications, the number of applications embedded within one and the same apparatus is likewise constantly increasing. This is explained notably by the wish to create ever more versatile objects, by associating for example in a cell phone of "smartphone" type or in a "personal digital assistant", telecommunication functions, multimedia functions, games or else satellite positioning functions. In addition to the need to provide ever higher computational powers, it is also necessary to be capable of optimizing the architecture specifically as a function of the current execution environment. This constitutes one of the technical problems that the present invention proposes to solve.

Moreover, many embedded systems are tending to offer wider scope for possibilities, leaving users free to use them as they please to execute their own applications. This wider scope impairs the effectiveness of static solutions for optimizing system architecture, commonly termed "off-execution" or "off-line" solutions, since the application context cannot be entirely determined in the design phase. Notably, having regard to advances in the capacity of video sensors and fast converters, the type and the volume of data manipulated are difficult to determine. Moreover, in a good many applications, the processing to be carried out varies as a function of the input data. By way of example, video-surveillance applications are typically aimed at searching for objects in a scene and then, when one or more objects have been detected, the application moves on to a phase of tracking the detected object, or indeed of analysis. This again constitutes one of the technical problems that the present invention proposes to solve.

Non-static solutions for optimizing system architecture, commonly termed "during execution" or "on-line" solutions, do not need to predict all the scenarios of use. They essentially entail implementing dynamic mechanisms for controlling resources, for example mechanisms for allocating computation resources or for allocating storage resources in such a way that they adapt rapidly to the application context. Intensive computation tasks then run alongside control-dominated tasks, with very strong interactions between these tasks which communicate with one another. However, to put such control mechanisms in place may be expensive in terms of performance. This again constitutes one of the technical problems that the present invention proposes to solve.

Indeed, the tasks communicate notably by way of data buffers. A buffer is an area of the memory to which a single producer task can write and from which several consumer tasks can potentially read. Within the framework of a very complex application, the number of memory buffers necessary for the execution of the application may thus exceed the total storage capacity of the machine. This again constitutes one of the technical problems that the present invention proposes to solve.

A current solution is to allocate and to deallocate, dynamically, the buffers currently being used by the application. The memory allocation is aimed mainly at reserving a memory space of sufficient size to store a given object which is manipulated in a program, and then at freeing said memory space after its use. But the allocator is also in charge of keeping information up to date which specifies which portions of the memory are used and which portions are free, doing so at the cost of a time penalty. The prior art abounds with techniques aimed at optimizing memory occupancy while minimizing the time penalty. Most known techniques are based on the allocation of contiguous memory areas, according to three types of approach: "Sequential Fit", "Segregated Free Lists" and "Buddy System".

Allocators of the "Sequential Fit" type are based on a linear list of all the free blocks in memory. Thus, a phase of allocating an object of nb memory pages consists in sequentially scanning this list until a free memory block of nb pages is found. This algorithm, and its various optimizations, is very simple to implement. But it is extremely penalizing since the whole list may potentially have to be scanned, in a sequential manner, before finding an allocatable memory area. This constitutes a major drawback of the "Sequential Fit" approach.

In order to accelerate allocation, allocators of the "Segregated Free Lists" type consider not a single list of all the free blocks in memory, but several lists of free blocks, each list containing only the free blocks of a certain size. For example, one list can contain the free blocks of 10 to 20 pages, another the free blocks of 20 to 40 pages, etc. During the allocation phase, the search for a free area is done only in the list containing the blocks of suitable size. This approach greatly accelerates the search, but it makes it necessary to maintain numerous lists. This constitutes a major drawback of the "Segregated Free Lists" approach.

In order to further accelerate allocation, allocators of the "Buddy System" type consider lists containing free blocks whose size is a power of 2. If a block does not have a size expressible as a power of 2, its size is approximated to the immediately higher power of 2. This restriction makes it possible to virtually cut the memory space into two sets of half size. Each set is in turn decomposed into two smaller entities until a limit size is reached. This approach decreases the number of lists, but it causes significant fragmentation of the memory. Indeed, rounding to the higher power of 2 gives rise to underutilization of the memory blocks. This constitutes a major drawback of the "Buddy System" approach.

However, be they implemented in software or be they implemented on specific hardware operators to further accelerate allocation, these three types of solutions for dynamically allocating and deallocating memory always suffer from the constraint of contiguity of the allocated memory areas. Indeed, this contiguity constraint leads in all cases to underutilization of the memory, allocation requests possibly failing not because the available memory space is not sufficient, but because no sufficiently wide contiguous area of memory exists. This again constitutes one of the technical problems that the present invention proposes to solve.

Various software solutions make it possible to allocate and to deallocate non-contiguous memory areas dynamically. For example, in the article "Page-Based Non-Contiguous Dynamic Memory Allocator" (J. Chen et al), a hardware allocator uses a data structure of "First In First-Out" (FIFO) type to store all the free memory pages. At each allocation, it pulls a page out of the FIFO structure. During a deallocation, it pushes the freed page into the FIFO structure. This simple solution allows good reactivity. But it requires a FIFO data structure whose size is directly proportional to the number of memory pages in the system. It may therefore have a high silicon cost. Moreover, this solution does not make it possible to optimize the distribution of the pages in the memory space in order to maximize the use of parallelism of access in the case where the memory space is distributed over several memory banks, more commonly designated "banked memory space". This constitutes a major drawback. Another example, in the article "SOCDMMU Dynamic Memory Management For Embedded Real-Time Multiprocessor System on a Chip" (M. Shahalan), a module called SOCDMMU uses an array describing the state of all the memory pages, be they empty or full. The search for an empty page is done by the "First-fit" algorithm, which searches for the first page available in the array, this page thereafter being allocated. The data structure making it possible to retrieve the free pages is much less voluminous than a FIFO structure, but the search for free pages may also be lengthy since, in the worst case, the whole of the memory state array may have to be scanned before pinpointing a free page. Moreover, neither does this solution make it possible to optimize the distribution of the pages in the memory space in order to best utilize the parallelism of access in the case of banked memories. This again constitutes one of the technical problems that the present invention proposes to solve.

Moreover, the management of data buffers manipulated simultaneously by a producer task and one or more consumer tasks is not optimized in current systems. In order to guarantee compliance with the dependencies of the "read-after-write" or "write-after-react" type, current systems assume roughly that the data producer and consumer tasks are explicitly synchronized. Thus, a page is freed only when it has been entirely consumed. This again constitutes one of the technical problems that the present invention proposes to solve.

SUMMARY OF THE INVENTION

The aim of the invention is notably to alleviate the aforementioned drawbacks, by proposing an innovative solution for dynamically managing a memory space distributed over several memory elements. By spreading the buffers over all the memory elements, it is more particularly effective when these elements are accessible in parallel. For this purpose, the subject of the invention is notably a device for managing data buffers in a memory space distributed over a plurality of memory elements. The memory space is allocatable by memory pages, each buffer comprising one or more memory pages. The buffers are usable by at least one processing unit for the execution of an application, the application being executed by a plurality of processing units (3) executing tasks in parallel, the memory elements being accessible in parallel by the processing units. The device comprises means for allocating buffers to the tasks during the execution of the application and means for managing access rights to the buffers. The means for managing the access rights to the buffers include means for managing access rights to the pages in a given buffer, so as to verify that writing to a given page does not modify data currently being read from said page or that reading from a given page does not access data currently being written to said page, in such a way as to share said buffer between unsynchronized tasks.

Advantageously, the means for allocating buffers can allocate the buffers in such a way as to minimize the maximum number of buffers allocated to one and the same memory element.

In a preferential embodiment, the means for allocating buffers can include memory page fill state registers, a given bit in a given register characterizing the empty state or the non-empty state of a given memory page. The means for allocating buffers can also include memory element fill state registers, a given bit in a given register characterizing the empty state or the non-empty state of a given memory element, as well as memory element gap state registers, a given bit in a given register characterizing the partially full state or the not partially full state of a given memory element. The means for allocating buffers can then include means for carrying out logic operations of AND type on the memory page fill state registers, so as to accelerate the updating of the memory element fill state registers, as well as logic operations of exclusive OR type on the memory page fill state registers, so as to accelerate the updating of the memory element gap state registers. The means for allocating buffers can include a priority encoder making it possible to determine in a single cycle the first bit at 1 in the memory element fill and gap state registers.

For example, the device can comprise means for deallocating buffers during the execution of the application, the physical addresses of the data contained in a buffer being variable if said buffer is deallocated and then reallocated in the course of the execution of the application. The processing unit can then use invariable virtual addresses to execute the application and the device can comprise means for translating the virtual addresses into physical addresses. The means for translating the virtual addresses into physical addresses can include at least one structure for storing correspondences between virtual addresses and physical addresses. The correspondences between the virtual addresses and the physical addresses of the data contained in a given buffer may be stored in one or more structures dedicated to said buffer. The means for translating the virtual addresses into physical addresses can also include copies of the storage structures in each processing unit.

Advantageously, the means for managing access rights to the buffers can include means for verifying that a given task is authorized to write data to a given buffer. They can also include means for verifying that the number of tasks reading from a given buffer does not exceed a predefined threshold. They can also include means for withdrawing from a task the right to write to a buffer and for authorizing another task to write to said buffer.

Advantageously, the means for allocating buffers can include means for verifying that the available memory space is sufficient to allocate a given buffer. The means for allocating buffers and the means for managing the access rights to the pages can make it possible, in a single allocation request, to allocate to a given task several pages in a given buffer.

The main advantages of the invention are further that it allows total occupancy of the memory space, that it has negligible time impact on the overall performance of the system and that it may be implemented at minimum silicon and energy cost.

BRIEF DESCRIPTION OF THE DRAWINGS

Other features and advantages of the invention will become apparent with the aid of the description which follows offered in relation to appended drawings which represent.

DETAILED DESCRIPTION

Figure 1:
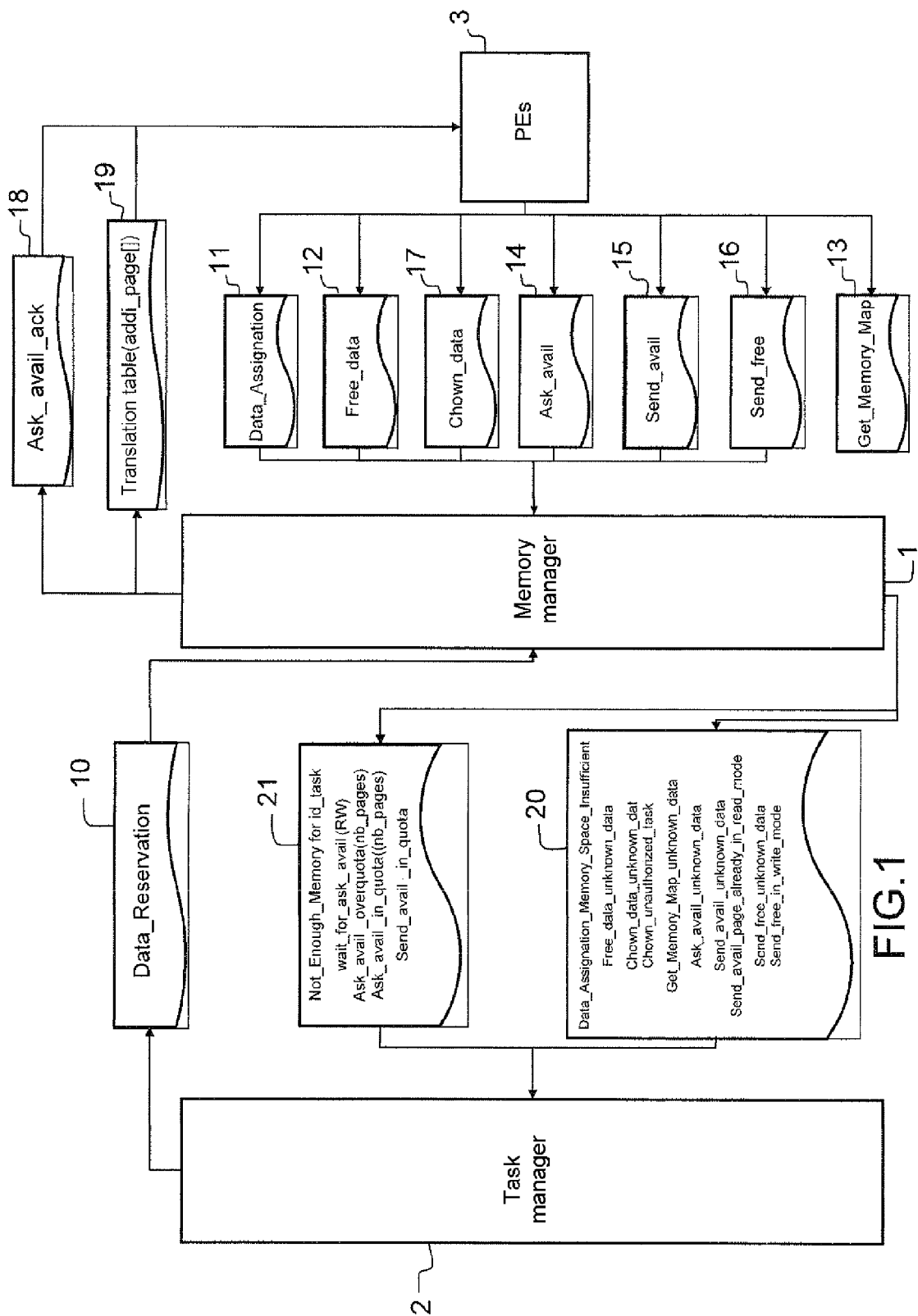
FIG. 1, by a functional diagram, an exemplary architecture according to the invention.

FIG. 1 illustrates by a functional diagram an example of possible exchanges between a memory manager 1 according to the invention, a task manager 2 and a grouping 3 of processing units. In the present exemplary embodiment, the task manager 2 is a specific entity. It is however conceivable for the task manager to be implemented by system software executing on the processing units 3. The task manager 2 allocates the tasks to the processing units 3, with a large capacity for migration from one processing unit to another. In the present exemplary embodiment, the memory manager 1 is in charge of allocating and of deallocating data buffers in a "cluster" of memories, the cluster comprising 32 memory banks, each bank containing 32 memory pages, each page containing 64 words and each word comprising 4 bytes. It must be clearly understood that all the numerical values mentioned in the description which follows merely correspond to the exemplary embodiments presented and that these values are wholly nonlimiting. In the subsequent description and for reasons of clarity, the memory banks may sometimes be designated either by "the memory resources" or simply "the memories". The processing units forming the grouping 3, which may be processors for example, may use the cluster of memories to execute applications in parallel, the processing units advantageously being able to access the memory banks in parallel. Thus, the memory manager 1 processes as a minimum requests of the type: Data_Assignment, Free_data, Get_Memory_Map, Ask_avail, Send_avail, Send_free, as well as, preferably requests of the type: Data_Reservation and Chown_data. The content of these requests is detailed subsequently. In the present exemplary embodiment, the task manager 2 dispatches requests 10 of Data_Reservation type to the memory manager 1, whereas the processing units 3 dispatch requests 11, 12, 13, 14, 15, 16 and 17 of the respective types: Data_Assignment, Free_data, Get_Memory_Map, Ask_avail, Send_avail, Send_free and Chown_data to the memory manager 1.

In the description which follows, the applications are modelable in the form of graphs of tasks which communicate by way of data buffers, a single producer task being able to write to a given buffer, whereas several consumer tasks may potentially read it.

It must be understood that the dynamic placement of the buffers in memory is merely one basic functionality among other functionalities provided by the memory manager 1. For example, a second functionality ensured by the memory manager 1 may be the translation of virtual addresses manipulated in the tasks into physical addresses. Indeed, to dynamically allocate/deallocate data buffers on available memories in a manner that is transparent to the tasks, virtual addressing of the buffers is preferable. Thus, the physical addresses of the buffers in memory may change as dictated by the allocations/deallocations without any change in their virtual address manipulated by the tasks. Advantageously, a third functionality of managing the access rights to the data may ensure compliance with the data dependencies, notably in the context of data flow applications where the producer and one or more of the consumers of a buffer are simultaneously active on a physically distributed memory space. For example, this may involve ensuring that a data item may be read only after having been produced. It should be noted that, generally, the management of data buffers manipulated simultaneously by a producer task and one or more consumer tasks is not optimized in current systems, which assume that the data producer and consumer tasks are explicitly synchronized, so as to guarantee compliance with the dependencies of "read-after-write" type and to automatically free a page as soon as it has been entirely consumed.

Figure 2:
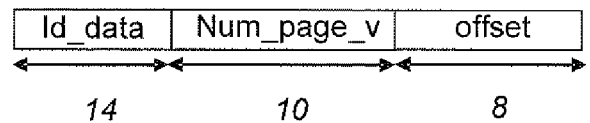
FIG. 2, by a structural diagram, an exemplary format of virtual addresses according to the invention.

FIG. 2 illustrates by a structural diagram an exemplary format of virtual addresses according to the invention. It will be considered subsequently that the processing tasks manipulate virtually addressed data in accordance with the format described in FIG. 2. In the present exemplary embodiment, a 14-bit id_data field makes it possible to identify the manipulated buffer, thereby making it possible to address 16384 buffers. A 10-bit Num_page_v field makes it possible to specify the page manipulated in the buffer, thereby authorizing a single buffer to occupy the entirety of the $2^{18}$ bytes of the memory space. An 8-bit offset field makes it possible to move, byte by byte, within the page.

The memory manager 1 is in charge of the dynamic placement of buffers of variable sizes on the system storage resources. In the virtual memory space manipulated by the processing tasks, the buffers are seen as contiguous memory areas. In order to best occupy the available memory space, the data placement does not assume for its part any contiguity constraint and allows the fragmentation of the memory space physically allotted to the buffer. The size of the memory space physically allotted to the buffer is specified to the memory manager 1 in the form of a number of pages. In the present example, the sizes of buffers are therefore multiples of 64×4=256 bytes, thereby authorizing optimized sharing of the memory space.

Figure 3:
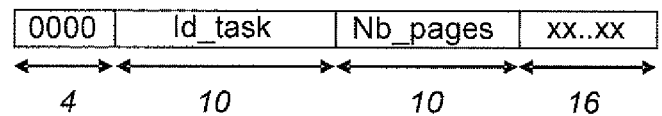
FIG. 3, by a structural diagram, an exemplary memory space reservation request according to the invention.

FIG. 3 illustrates by a structural diagram an exemplary request 10 of Data_reservation type according to the invention, allowing memory space reservation. Indeed, before placing a buffer in memory, sufficient space must have been reserved. A Data_reservation request is on the initiative of the task manager 2. On receipt of this request, in this exemplary embodiment, the memory manager 1 recognizes it by virtue of its request type identifier 0000 on the first 4 bits. Next, the memory manager 1 verifies that there is sufficient memory for all the buffers created by a task id_task. If such is the case, nb_pages memory pages are reserved. They are physically allotted to the various buffers associated with the task id_task during the data placement requests. If the request fails through lack of a sufficient number of pages, the sender of the request is informed thereof so as to take appropriate measures as a function of the context, such as for example task suspension or reduction of service quality. If this reservation function does not exist, a task may be disabled while awaiting memory space to store these buffers. The last 16 bits marked x are unused. In FIGS. 4 to 10 which follow and which represent requests, the first 4 bits make it possible to identify the type of request and the last bits marked x are unused.

Figure 4:
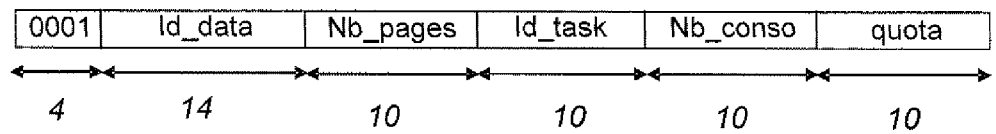
FIG. 4, by a structural diagram, an exemplary data placement request according to the invention.

FIG. 4 illustrates by a structural diagram an exemplary request 11 of Data_Assignment type according to the invention, allowing data placement. The placement of a buffer in memory is carried out for example during the initialization of a task. For each of the virtual pages of a buffer, this placement makes it possible to search for a free memory page in the physical memory space and to allot it thereto. Hereinafter, applicable optimizations for accelerating this function will be discussed. The Data_Assignment placement requests are preferably dispatched by the processing unit executing the task during the phase of initialization of the latter, or at the least before manipulating the buffer. They take for example the form illustrated in FIG. 4. The first 4 bits 0001 of this request make it possible to identify its type. The following 14 bits contain the identifier id_data of the buffer. The following 10 bits contain the buffer size nb_pages expressed in number of pages. In addition to the search and the assignment of free memory pages to the buffer, the memory manager 1 stores information relating to the buffer such as the number of consumers or the identifier of the owner, which will be utilized subsequently during phases of address translation and of access rights verification. Thus, the following 10 bits contain the identifier id_task of the buffer's owner task, that is to say the task authorized to write to the buffer. The following 10 bits contain the number of consumers of the buffer nb_consu. The following 10 bits indicate the fill ratio quota on the basis of which the memory manager 1 signals the fill state of the buffer to the task manager 2. In addition to the search and the assignment of free memory pages to the buffer, the memory manager 1 stores information relating to the buffer, such as the number of consumers or the identifier of the owner, which will be utilized subsequently during the phases of address translation and of access rights verification.

Figure 5:
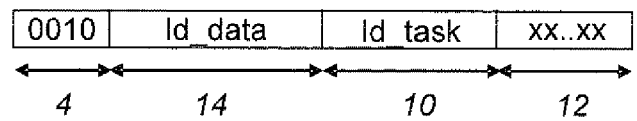
FIG. 5, by a structural diagram, an exemplary buffer freeing request according to the invention.

FIG. 5 illustrates by a structural diagram an exemplary request 12 of Free_data type according to the invention, making it possible to free a buffer. The dynamic management of the memory space being meaningful only if buffers are not used throughout the execution of the application, it is moreover preferable to free buffers as soon as possible. This freeing makes it possible to retrieve all the memory pages associated with a buffer and to free each of them. These freeings of buffers are carried out when each of the nb_consu potential consumers of a buffer has declared that it has finished using said buffer. This is done by way of requests Free_data complying with for example the format of FIG. 5, of request type identifier 0010, and making it possible to identify the buffer id_data whose task id_task has finished the utilization.

The translation functionality converts virtual addresses having for example the format represented in FIG. 2 into physical addresses that may be dispatched to the memory. These translations are systematically and automatically carried out when reading from or writing to memory. Advantageously, this may involve searching through suitable storage structures for the physical address corresponding to the virtual address manipulated. All the processing units working in parallel and accessing shared data at high speed, it is then preferable to distribute this translation functionality at the level of each of the processing units so as to avoid conflicts of access to the storage structures. In the present exemplary embodiment, each processing unit employs a local translation unit employing translation tables, these tables advantageously being storage structures of associative array type. Thus, with a data item manipulated in a task, a translation unit can firstly associate a translation table. Next, by virtue of this translation table, the translation unit can ensure the correspondence between a virtual page and its physical address. Advantageously, having regard to the task migration capabilities and to the fact that a buffer may have several consumers, the translation tables used may merely be copies of translation tables maintained and made available by the memory manager 1.

Figure 6:
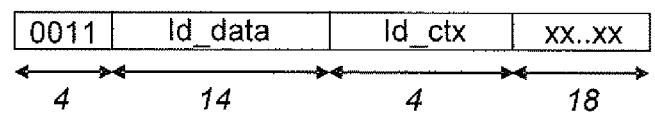
FIG. 6, by a structural diagram, an exemplary translation table acquisition request according to the invention.

FIG. 6 illustrates by a structural diagram an exemplary request 13 of Get_Memory_Map type according to the invention, allowing the acquisition of a translation table. Indeed, for each of the data manipulated in the task, the processing unit repatriates all the page translations. The Get_Memory_Map requests contain on 14 bits the identifier of the buffer id_data whose translation table is desired. For optimization reasons discussed subsequently, the translation tables may advantageously be split up into several tables of reduced size, each associated with a context number. In the present example, tables that can contain up to 1024 translations are split up into 16 contexts of 64 translations. A field id_ctx on 18 bits makes it possible to identify the context number. The memory manager 1 returns the translation table requested by a message 19 of Translation_table type to the processing unit.

The functionality for managing data access rights may for example on the one hand make it possible to verify the legality of the manipulations of the data buffers as a whole and on the other hand to verify the validity of the accesses to the data pages. In the first case, this then entails verifying that a task is indeed authorized to write data to a buffer or optionally that the number of tasks consuming a buffer does not exceed a quantity defined off-line. The verification of the validity of the accesses to the data pages makes it possible for its part to guarantee the integrity of the data, by verifying that a read does not occur on a page currently being written to or that a write does not modify a page currently being read from. These verifications of the access rights may be carried out by virtue of explicit requests addressed by the processing units to the memory manager 1. These requests are dispatched before each manipulation of a new page. Thus, before manipulating the data of a page id_page of the buffer id_data, whether by reading or writing, the processing unit executing the task id_task dispatches a request Ask_avail to the memory manager 1 so as to verify its availability. For a read-availability request, this entails verifying that the data item has already been produced and that it is no longer modified. For a write-request, it entails verifying that the page will no longer be read. Thus, it is possible to share buffers between unsynchronized tasks.

Figure 7:
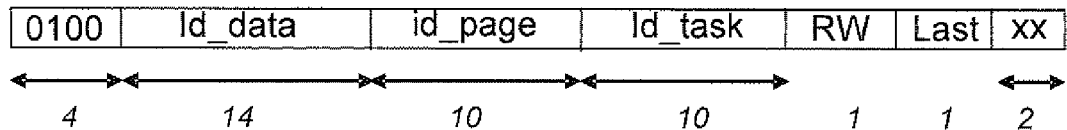
FIG. 7, by a structural diagram, an exemplary data availability request according to the invention.

FIG. 7 illustrates by a structural diagram an exemplary request 14 of Ask_avail type according to the invention, making it possible to ask about the availability of data. In addition to the fields Id_data, id_page and Id_task already described previously, a bit RW indicates whether the request is a read-availability or write-availability request. The last bit Last makes it possible, for optimization purposes, to indicate whether a request is the last of a series of availability requests. These requests may be explicit in the code of the task. However, if the impact in terms of performance is appreciable, it may be envisaged that they be generated automatically following invalid accesses to the translation tables. The memory manager 1 responds to the processing unit through an acknowledgment of receipt 18 of Ask_avail_ack type.

Figure 8:
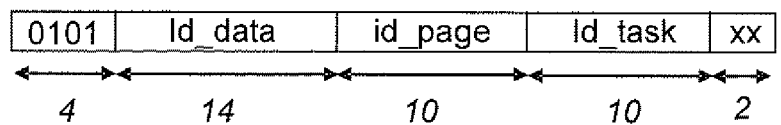
FIG. 8, by a structural diagram, an exemplary request to make data available according to the invention.

FIG. 8 illustrates by a structural diagram an exemplary request 15 of Send_avail type according to the invention, allowing data to be made available. Subsequent to the placement phase, all the pages of a memory buffer are automatically initialized with write-access rights in respect of the buffer's owner task. During the execution phase, the evolutions of the access rights to these pages are on the other hand managed explicitly so as to make a page read-accessible or write-accessible. The Send_avail requests are dispatched by the processing unit executing the task id_task to signal that the latter will no longer modify the data of the page id_page of the buffer id_data. The memory manager 1 then gives read-access rights to the nb_consu readers of the buffer id_data and the translation unit of the processing unit sending the request invalidates the translation line associated with this page.

Figure 9:
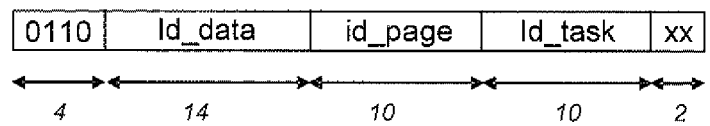
FIG. 9, by a structural diagram, an exemplary page freeing request according to the invention.

FIG. 9 illustrates by a structural diagram an exemplary request 16 of Send_free type according to the invention, making it possible to free a page. The Send_free requests are dispatched by the processing unit executing the task id_task to signal that the latter will no longer access the page id_page of the buffer id_data. The number of consumers nb_consu of the page is then decremented. When the latter reaches 0, there is no longer any potential consumer of this page and the memory manager 1 makes it available again for writing to.

Figure 10:
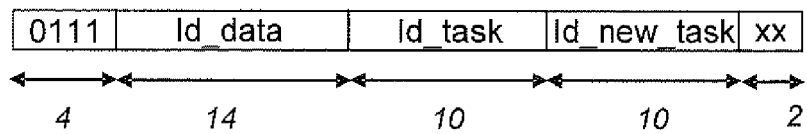
FIG. 10, by a structural diagram, an exemplary request to change buffer owner according to the invention.

FIG. 10 illustrates by a structural diagram an exemplary request 17 of Chown_data type according to the invention, making it possible to change a buffer's owner task. In the cases where the consumption tasks modify only very small quantities of data in large sets, for example a few pixels in an image, the basic execution models of the prior art often cause the complete copying over of the whole data set into a new buffer. To minimize the copyover times, it is conceivable to reuse the starting buffer so as to rewrite only the modified data. In this case, the consumer task does not create any new buffers but the producer task gives it write-access rights, when it terminates, by way of Chown_data requests, which specify the initial owner id_task of the buffer id_data and this buffer's new owner id_new_task on 10 bits. It should be noted that this type of mechanism is liable to lead to lockups if it is not used cautiously. It should be used only locally, when the code generation environment guarantees the absence of problematic cases.

FIG. 1 also illustrates the information returned to the task manager 2 so that it optimizes its allocation. For example, two blocks 20 and 21 group together error messages returned to the task manager 2. Certain messages may be utilized by the task manager 2 so as to limit the waits at the level of the processing units 3. The most useful items of information are the waits pursuant to the requests Ask_avail or else the fill quotas of the buffers. But potential errors are very numerous, such as for example illegal accesses, abnormally long waits, memory capacity overflows or else attempts to access unidentified buffers.

The memory manager 1 is at the core of the activities of data transfers in the cluster of memories. Consequently, its performance has a foremost impact on the overall performance of the system. The architecture of the memory manager 1 is consequently defined so as to optimize its processing times. In particular, frequent activities such as the management of the access rights to the data pages are preferably processed so as to authorize a reactivity of the order of a cycle. Although less critical on the overall performance of the system, the allocation operations are also optimized so that their processing does not lead to a significant increase in the time required to initialize the tasks on the processing units (of the order of a few hundred cycles).

The dynamic placement of data in memory according to the invention makes it possible moreover to fully utilize the memory space of the cluster. For this purpose, the memory manager 1 is capable of fragmenting the data in a way which is totally transparent to the computation tasks. The memory access time moreover being dependent on the number of processing units in the grouping 3 simultaneously accessing a memory, the allocation minimizes the risks of parallel access to the memories, by minimizing the number of buffers sharing a memory. Thus, the number of competing accesses to the memories does not generally exceed the maximum parallelism of the accesses to the data induced by the application (number of consumers of a buffer).

Despite the performance constraints associated with the memory manager 1, it is important to curb the complexity and the silicon cost of this module. The architecture of the memory manager 1 is therefore defined so as to minimize the volume of data manipulated and to favor the use of standard memory components.

The module for managing buffers, the core of the memory manager 1, places data buffers dynamically in the available memory resources. Although the literature is rich in dynamic memory management solutions, the invention considers an original context which does not suffer from the data contiguity constraint. Indeed, all the solutions described in the literature attempt to place data sets in sufficiently sizable contiguous memory spaces. The objective of the placement module therefore includes, in the general case, finding the right compromise between allocation performance and memory occupancy. In the context of the invention, a data buffer can readily be split up so as to be distributed over several discontinuous memory areas. This therefore makes it possible to guarantee complete use of the memory space.

In a conventional manner, the placement of a buffer of nb_page in memory comprises repeating, nb_page times, an operation of searching for a free page in memory, and then the assignment of this free page to the data buffer. This operation is based on a free page list or on a state register for the pages of the memory space. In the first case, a doubly linked list makes it possible to rapidly retrieve, for each operation, the first page available at the cost of a high quantity of memory. In the case of a state register, the memory quantity is minimal but the operation of searching for free pages may be lengthy if there is no free page search acceleration operator (priority encoder). In both cases, the placement time is proportional to the number of pages to be placed and the pages allowing the storage of the buffers are distributed over the various banks of the cluster.

The memory data fragmentation thus engendered might, however, lead to the sharing of the memories between several data buffers. Hence, it becomes tricky to predict the time taken to access a buffer since the latter is no longer dimensioned by the number of consumers/producers of a buffer (application data item). Henceforth, the time taken to access a data item becomes dependent on the number of readers/writers from/to the memory which stores said data item and may therefore no longer be precisely known at the time of execution. The allocation strategy put in place is therefore aimed at delaying the fragmentation of the memory by maximizing the number of memories storing only a single data buffer. In a preferential manner, the data will moreover be allocated block-wise by simultaneously placing several pages in memory, so as to accelerate this placement step.

To favor the uniqueness of the buffers in the memories, the strategy adopted is notably to accept that part of the banks of the cluster will be shared between several data buffers. When a buffer does not make it possible to reserve a complete memory, the buffer will thus be placed on these memories by priority, so as not to increase the quantity of memory accommodating several buffers. This sacrificing of certain memories thus makes it possible to avoid multiplying the number of memories associated with several buffers and thus to prevent progressive fragmentation of the memory space. This strategy is translated by the memory buffer placement algorithm, taking as parameters the buffer identifier id_data and the number of pages of the buffer nb_pages as indicated in the annex.

The foregoing algorithm is a simplified version, not doing any tests to verify whether the buffer is valid or whether the placement is proceeding correctly. Initially, the nb_pages of data of the buffer id_data are distributed as NbM+1 sets of pages, where NbM corresponds to the number of memories that may be entirely filled by a part of the buffer. Nbp is the number of pages remaining in the NbM+1$^{st}$ set, insufficient on its own to fill a memory. Thereafter, for each set of 32 pages (size of a memory in our example), the algorithm searches for an empty memory and assigns, in the case of success, each of the pages of the memory to the buffer, by way of an Assign_Page function. If no entirely free memory is available, each page of the set is placed separately in a free page of a not entirely full memory. The Nbp pages not making it possible to completely fill a memory are conversely mapped in a favored manner onto partially filled (or not completely full) memories. If there is no longer any partially full memory, an empty memory will be used.

Figure 11:
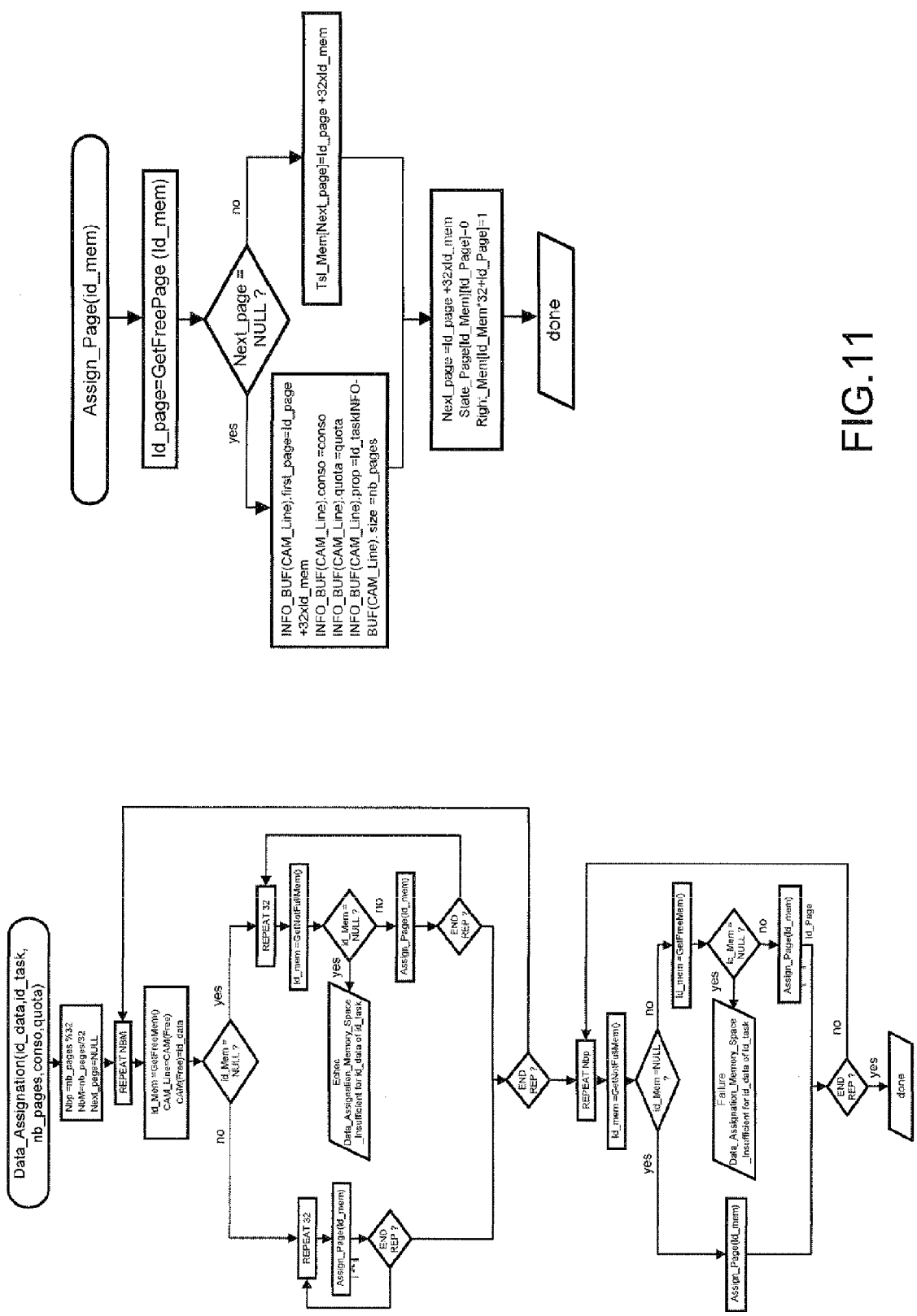
FIG. 11, by an activity diagram, exemplary operation of a memory manager according to the invention for processing a data buffers placement request.

FIG. 11 illustrates by an activity diagram, exemplary operation of the memory manager 1 according to the invention, for processing a Data_Assignment request for the placement of data buffers. Advantageously, in the present example, for each of the 32 memory banks, a 32-bit register can characterize the fill state of each of the 32 pages that it contains, a bit being equal to '1' for empty and '0' otherwise. Advantageously here again, a 32-bit register can characterize the fill state of each of the 32 memory banks, a bit being equal to '1' for empty and '0' otherwise. Advantageously here again, a 32-bit register can characterize the gap state of each of the 32 memory banks, a bit being equal to '1' for partially full and '0'. Thus, 34 registers of 32 bits are used in total in the present exemplary embodiment. The information contained in the fill state and gaps state registers for the banks can advantageously be automatically updated by virtue of AND and XOR functions respectively, on the basis of the contents of the page state registers. The search for the empty or partially full memories can then be done by way of a 32-bit priority encoder, capable in a cycle of determining the first bit at 1 in the bank state registers.

In addition to this information, the memory manager 1 also manipulates a memory called INFO_buf, storing all the information associated with a buffer: its owner, the number of its consumers and optionally the number of pages on the basis of which the memory manager 1 must signal the state of the buffer to the task manager 2. This memory is addressed by virtue of the buffer identifier id_data and is associated with an associative memory CAM_buf of CAM type according to the acronym standing for "Content-Adressable Memory", CAM_buf forming the tie between the identifier of the buffer and the address for storing the information associated therewith in INFO_buf. A memory Shared_Tsl_Mem is also used so as to store the information useful for the translations of the virtual addresses into physical addresses, in the form of a linked list ordered in accordance with the virtual page numbers.

Figure 12:
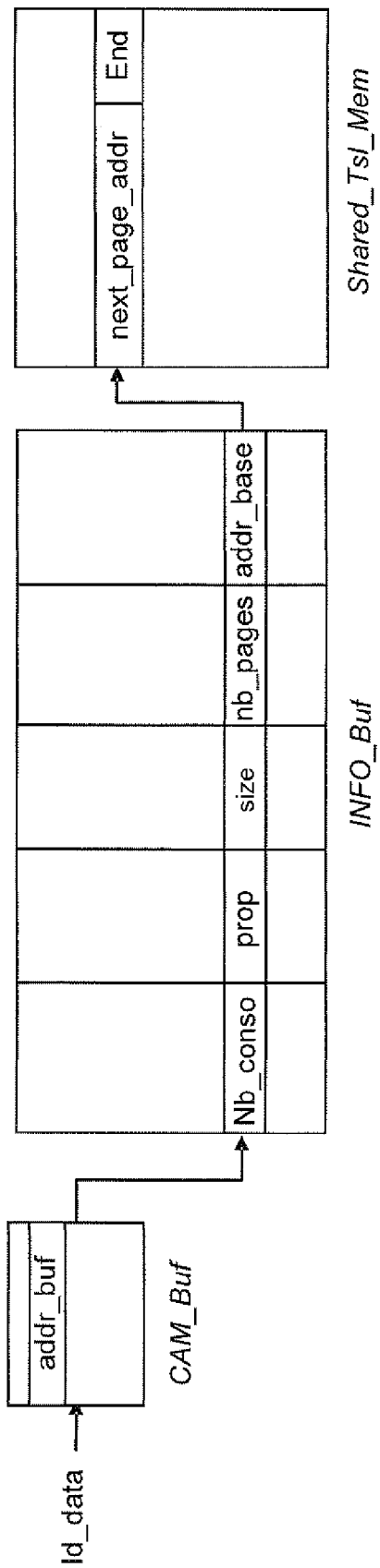
FIG. 12, by a structural diagram, an example of memory areas allowing the implementation of the invention.

FIG. 12 illustrates by a structural diagram an example of memory areas allowing the implementation of the invention. The start address of the translation list is an item of information associated with the data buffer and stored in the INFO_buf memory, as illustrated in FIG. 12. It should be noted that several entry points in this translation list may be specified in INFO_buf if the translation list associated with a data item is split up into several contexts. Finally a last memory Right_Mem is manipulated, so as to initialize access rights to the data pages, with write-access rights.

It should be noted that errors are signaled to the task manager 2 if a placement request fails, that is to say if there are no more free pages although the placement request has not been acknowledged. The main risk of this case occurring is if a memory reservation request has not preceded a buffer placement request. It would be possible to verify earlier that sufficient memory space has been reserved for the task id_task to store the buffer. This assumes that a list of the pending tasks awaiting a data replacement request is kept up to date by the memory manager 1.

The memory space reservation is done very simply by means of an available_pages variable which is local to the memory manager 1 and which indicates the number of memory pages available on the cluster. Upon a reservation request for nb_pages for the task id_task, the memory manager 1 verifies that there are sufficient pages available and reserves them if possible. The simple subtraction of nb_pages from available_pages allows this reservation, as long as any data placement request is preceded by a reservation request.

Figure 13:
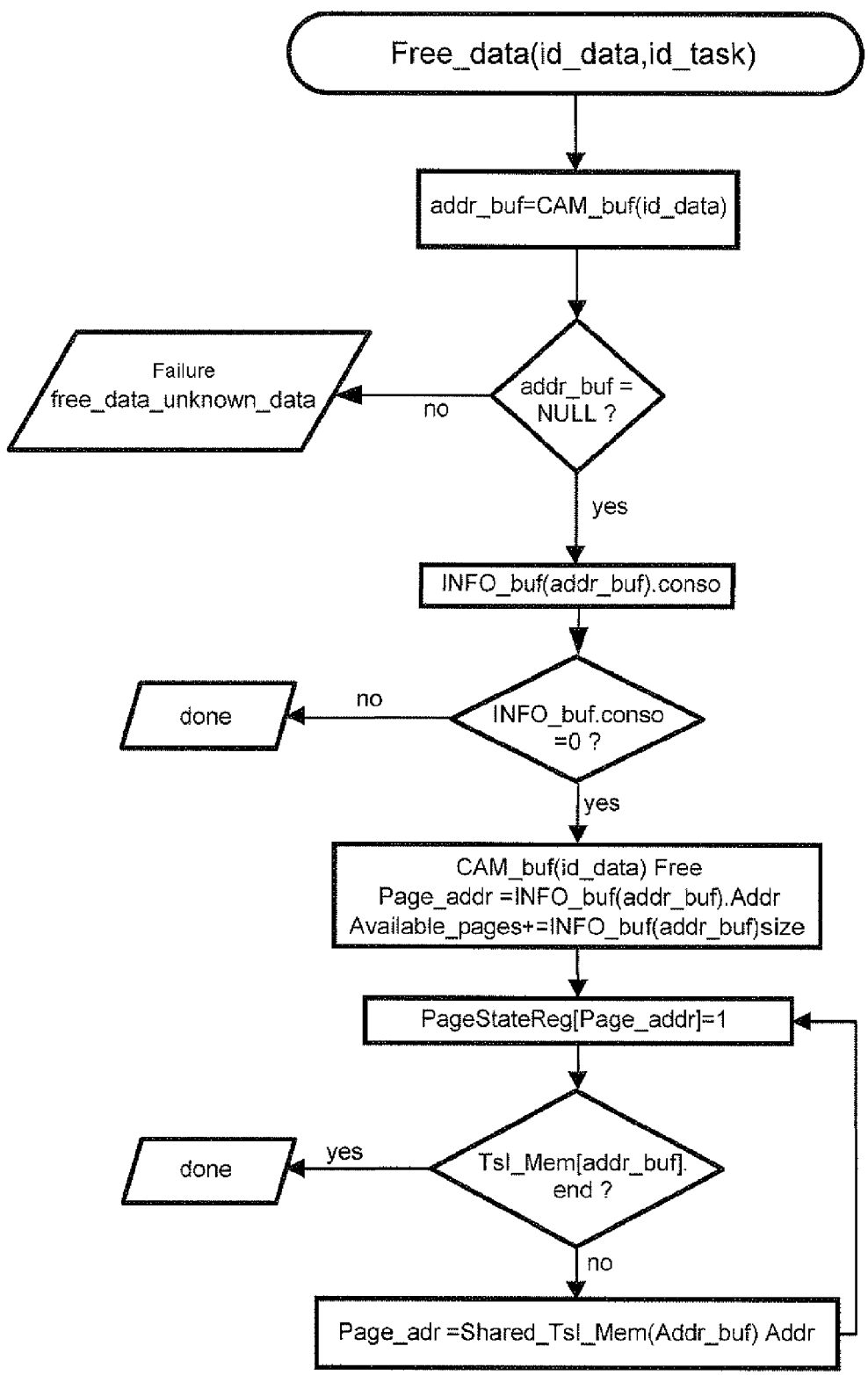
FIG. 13, by an activity diagram, exemplary operation of the memory manager according to the invention for processing a data buffers freeing request.

FIG. 13 illustrates by an activity diagram, exemplary operation of the memory manager 1 according to the invention, for processing a request Free_data to free data buffers. On receipt of a buffer freeing request Free_data(id_data,id_task), the memory manager 1 firstly reads the information relating to this buffer in the memory INFO_buf. An error is returned to the task manager 2 if the data identifier id_data is unknown or if the buffer is not read-accessible. In the converse case, the number of consumers nb_consu associated with this buffer is decremented. If it reaches 0, the memory pages associated with this data buffer are then freed one by one, by scanning the list, stored in Shared_Tsl_Mem, of physical pages that are used for the buffer. A field associated with each element of the list makes it possible to identify the last element of the latter and therefore to terminate the freeing loop.

Figure 14:
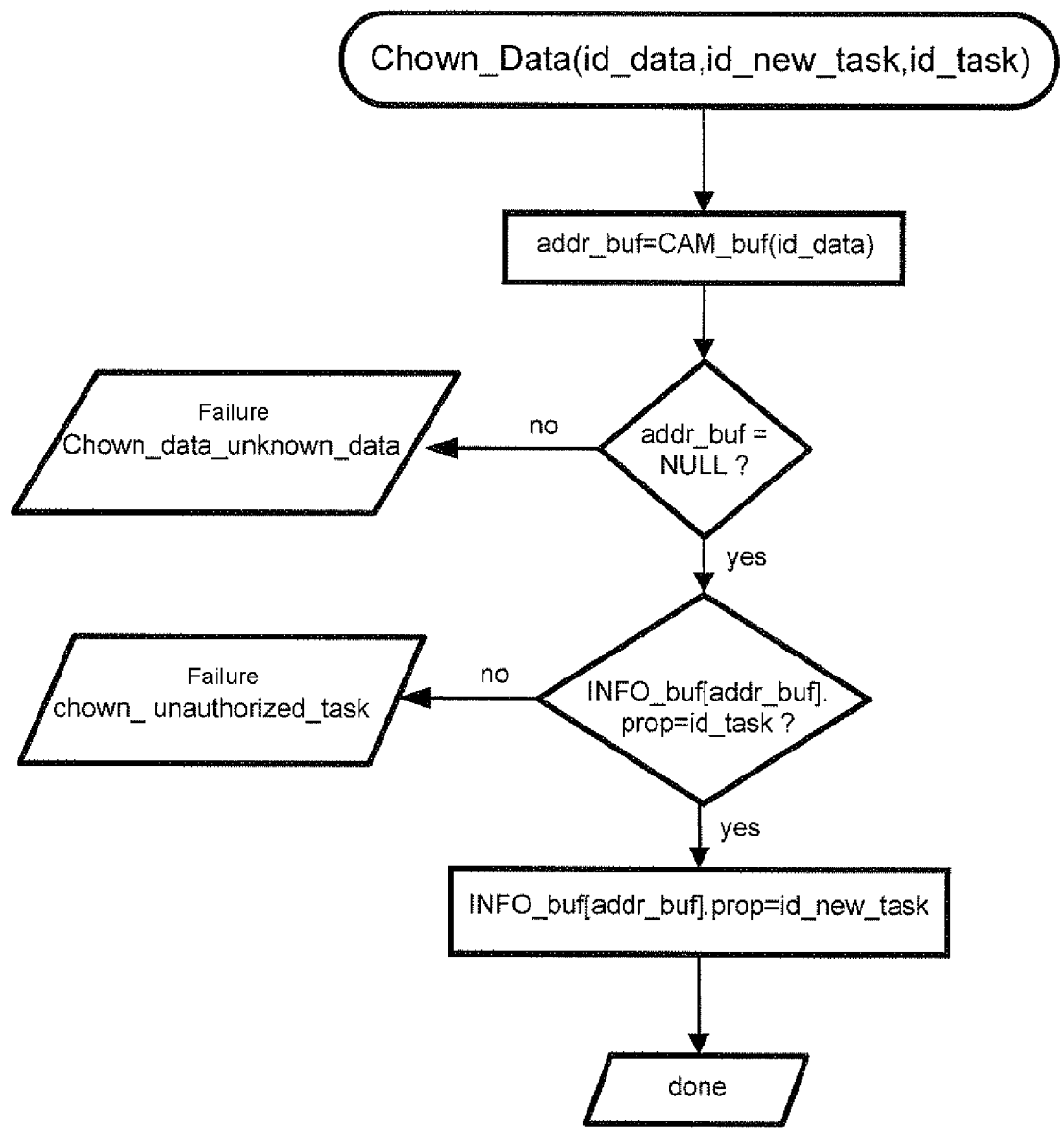
FIG. 14, by an activity diagram, exemplary operation of the memory manager according to the invention for processing a request to change owner of a data buffer.

FIG. 14 illustrates by an activity diagram, exemplary operation of the memory manager 1 according to the invention, for processing a request Chown_data to change owner of a data buffer. Here this only entails verifying the validity of the request by noting that the buffer is indeed referenced and that the sender of the request is indeed the owner of the buffer. If the request is valid, it is processed by the modification of the INFO_buf memory owner field.

Figure 15:
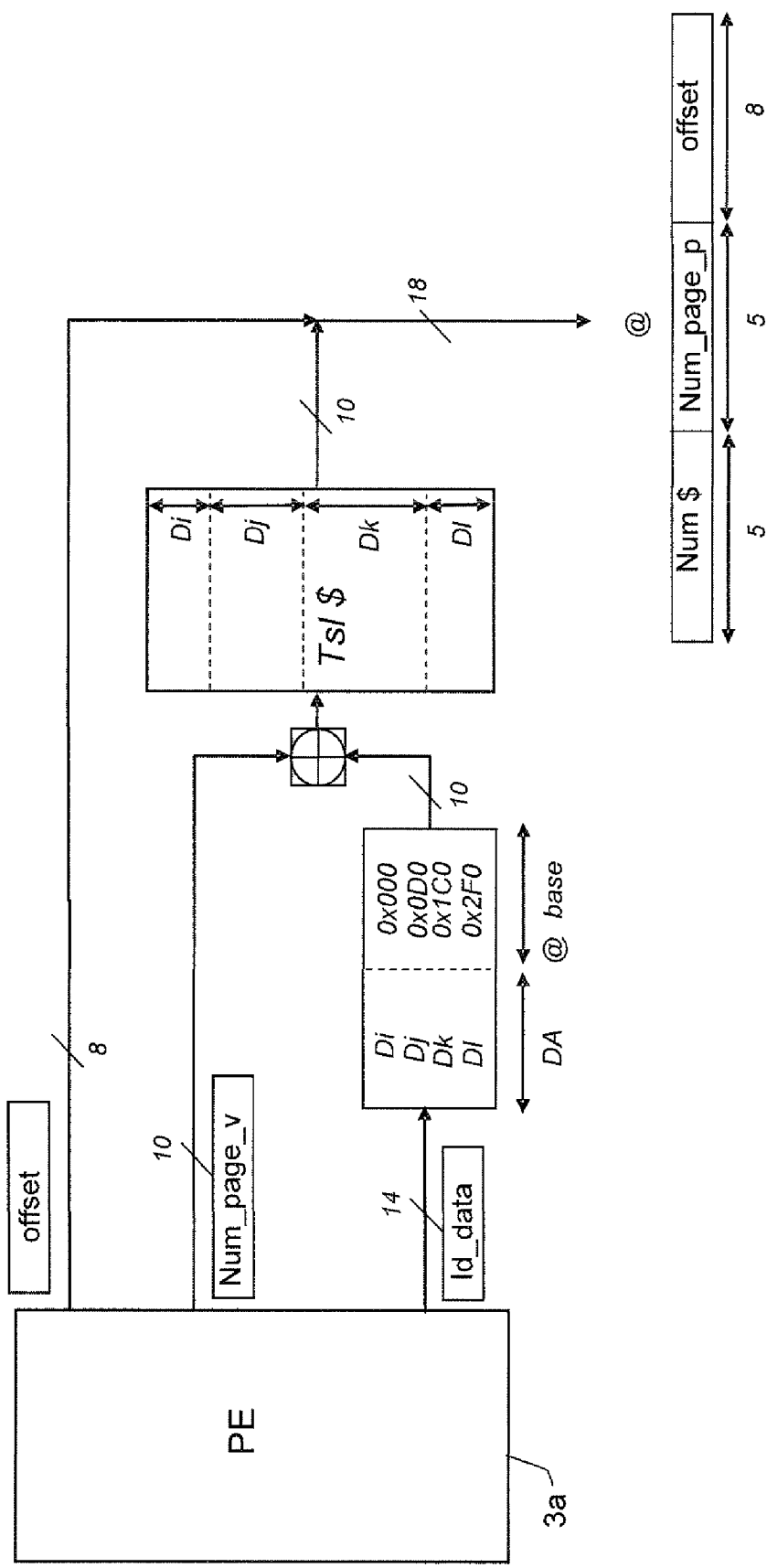
FIG. 15, by a structure diagram, an exemplary translation unit according to the invention.

FIG. 15 illustrates by a structure diagram an exemplary translation unit according to the invention, ensuring the conversion of the virtual addresses into physical addresses for a processing unit 3a of the grouping 3. These translations are carried out systematically and automatically when reading from or writing to memory, in accordance with a mechanism illustrated in FIG. 15. The basic element used to carry out the translation is a translation table, containing in the present exemplary embodiment 1024 entries, this corresponding to the cluster's storage capacity expressed in number of pages. This table contains the translations useful for each of the addresses manipulated in the task currently being executed on the processing unit. The translation table is constructed on the basis of a standard memory Tsl_$. The loading of this translation table is carried out on initialization of the task, subsequent to requests Get_Memory_Map(id_data, id_ctx) dispatched for each of the buffers manipulated in the task, both in read mode and in write mode. Upon the dispatching of this request, the translation unit of the processing unit fills an associative memory of CAM type by specifying for the buffer id_data, the address from which the translation table of the buffer will be stowed away in the memory Tsl_$, knowing that the buffers are stowed consecutively in this memory.

Figure 16:
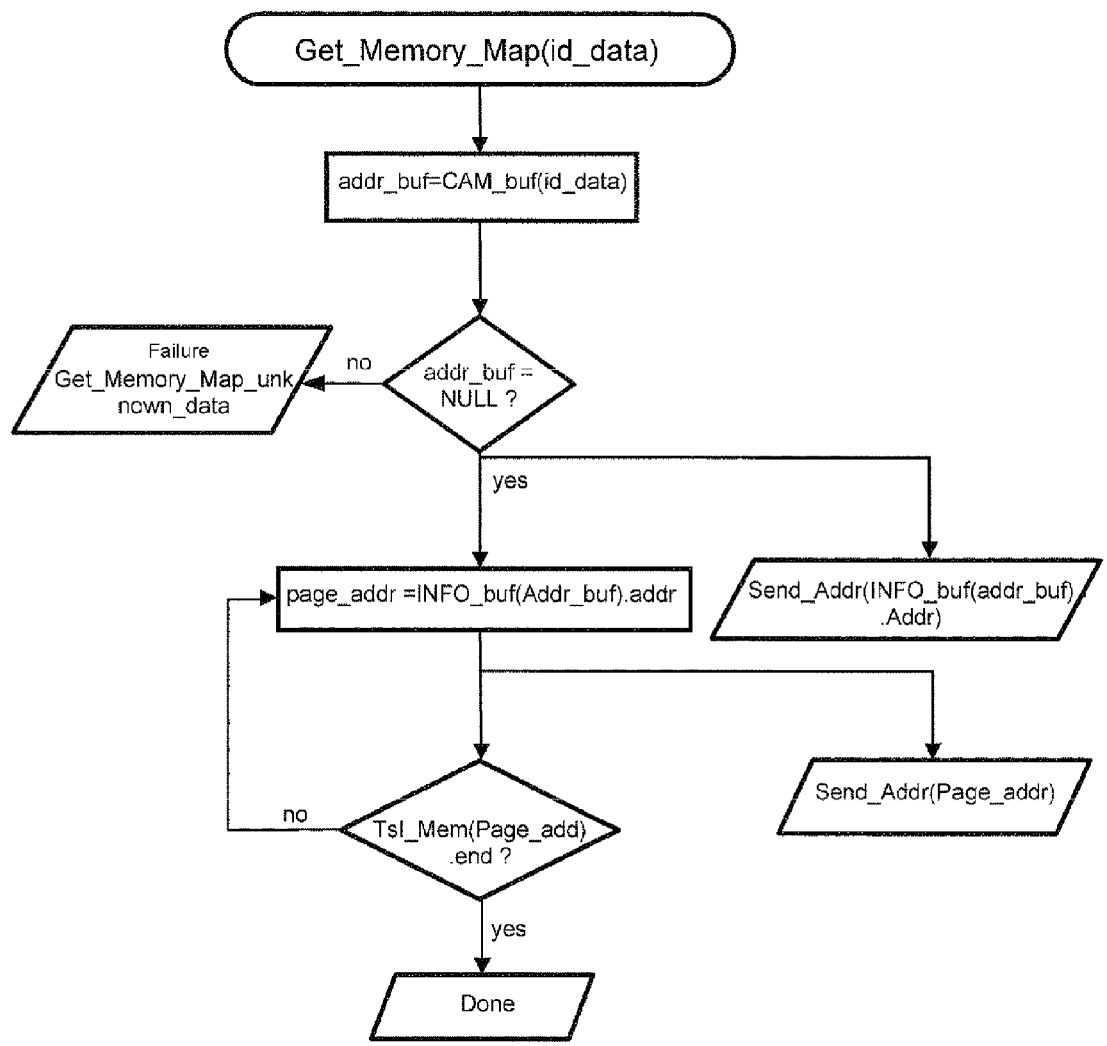
FIG. 16, by an activity diagram, exemplary operation of the memory manager according to the invention for processing a translation table transfer request.

FIG. 16 illustrates by an activity diagram, exemplary operation of the memory manager 1 according to the invention, for processing a translation table transfer request Get_Memory_Map. On receipt of a Get_Memory_Map(id_data) request, the memory manager 1 verifies on the one hand the validity of the request and on the other hand scans the ordered list of physical pages used for the buffer id_data. It should be noted here that the id_ctx field of the request is not in this example utilized, but that it could be within the framework of optimizations. In parallel with these operations, the translation unit of the processing unit, having initiated the request, fills the memory Tsl_$ by incrementing the write address on each receipt of a new physical page number. Thus the memory Tsl_$ contains the list of translations ordered according to the virtual address numbers. Thus, each word of the memory Tsl_$ contains a physical page number corresponding to a virtual address equal to the position of the word in the memory. This virtual address is obtained by adding the base address in the memory Tsl_$ of the translation table of the buffer id_data, to the virtual page number Num_page_v describing the page manipulated in this buffer. A possible optimization at this level is to do this addition at the time of compilation. The high-order weight of the address manipulated in the processing units is then the sum of the identifier of the data item and of the virtual page number, thereby making it possible to refrain from carrying out this addition hardware-wise. The memory of CAM type contains for its part as many entries as manipulatable buffers in a task.

The last element of the memory manager 1 makes it possible to manage the access rights to the data and thus to guarantee the integrity of the manipulated data. It is used to ensure that a data item is not read before having been produced and conversely that it is not modified during the reading thereof. It responds to the requests Ask_avail issued from the processing units as a function of the current rights of the manipulated data pages. It also updates the access rights to these pages subsequent to the Send_free and Send_avail requests. It should be noted that, in the present exemplary embodiment, blocking requests are considered. However, the processing of requests of overall availability could be envisaged within the framework of optimizations.

Figure 17:
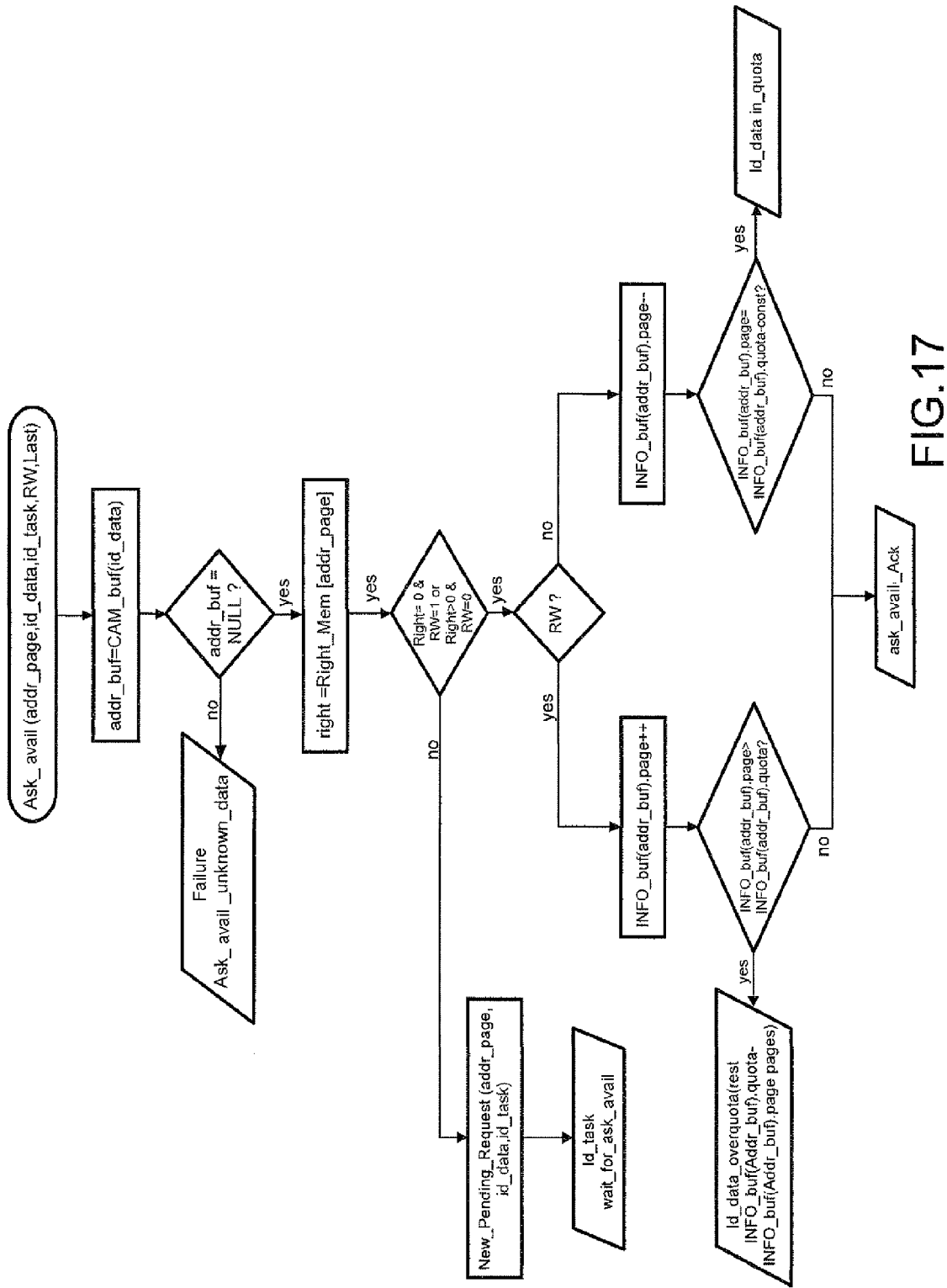
FIG. 17, by an activity diagram, exemplary operation of the memory manager according to the invention for processing a request asking about availability.

FIG. 17 illustrates by an activity diagram, exemplary operation of the memory manager 1 according to the invention, for processing a request Ask_avail asking about availabilities. This simply entails comparing the mode of access desired to the data page addr_data with the access right to this page, stored in the memory RightMem. If the page is not accessible, for example if the page is being read during a write-request or vice versa, the processing unit sending the request is placed on standby and the request is placed in a pending_request queue of waiting requests. In the converse case, the number of pages associated with the data buffer is updated, possibly causing the buffer to go to over-quota. In the latter case, the fill state of the buffer is uploaded to the task manager 2 with a view to possible utilization. For a write, the RW field of the Ask_avail request equals 1, otherwise 0.

Figure 18:
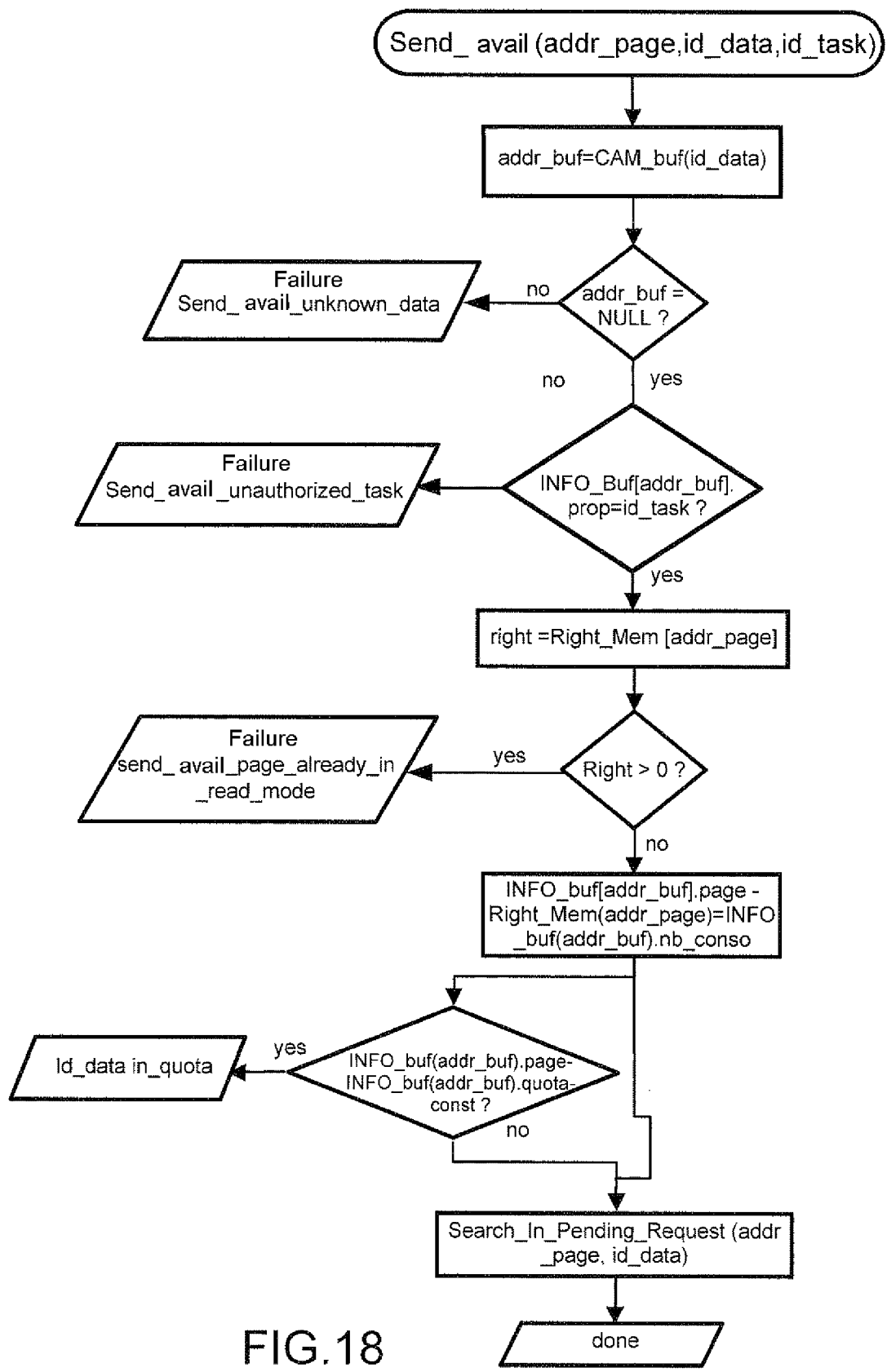
FIG. 18, by an activity diagram, exemplary operation of the memory manager according to the invention for processing a request to make pages available.

FIG. 18 illustrates by an activity diagram, exemplary operation of the memory manager 1 according to the invention, for processing a request Send_avail to make a page read-available. On receipt of a Send_avail request, it is initially verified that the data buffer id_data is known and that the request is dispatched by the owner id_task of this buffer. It is also verified that the page is not already read-available, in which case an error is returned to the task manager 2, before modifying the access right to the addr_page page. The number of write-pages associated with this buffer is also decremented and a verification of the quota is done so as optionally to forewarn the task manager 2 of the fill state of the buffer. Finally, the list of pending requests is scanned so as to verify whether a task had already asked about read-availability of the page, in which case its request may be acknowledged. It should be noted henceforth that the scanning of this list of pending requests may be relatively lengthy, since it is sequential. If it is assumed that 32 tasks may be simultaneously active, a scan time, in the worst case, of at least 32 cycles must in fact be taken into account. This search could be accelerated within the framework of optimizations.

Figure 19:
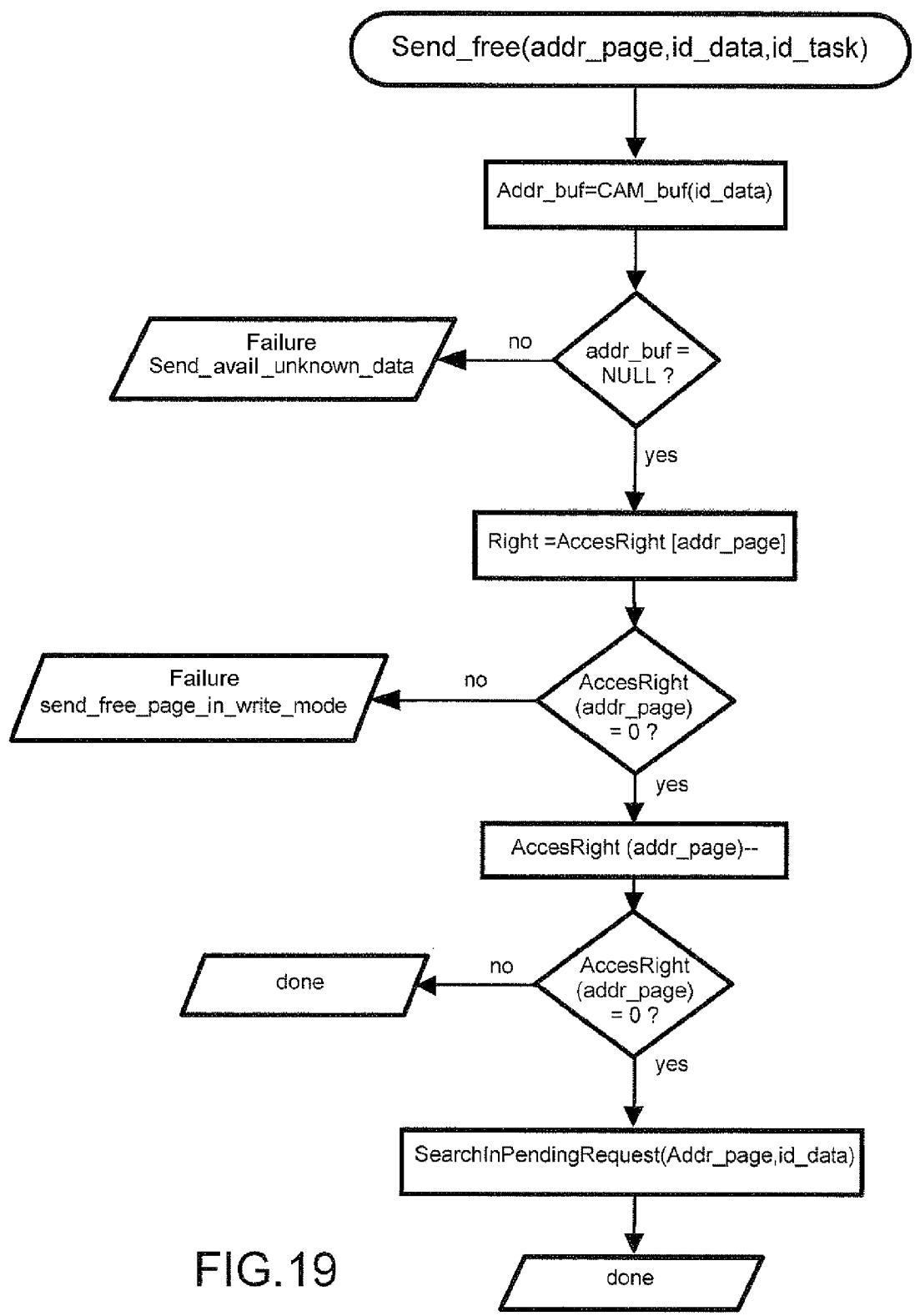
FIG. 19, by an activity diagram, exemplary operation of the memory manager according to the invention for processing a page freeing request.

FIG. 19 illustrates by an activity diagram, exemplary operation of the memory manager 1 according to the invention, for processing a request Send_free to free pages, aimed at freeing a page and therefore making it available for writes. On receipt of a Send_free request, the memory manager 1 verifies the validity of the request by assuring itself that the data buffer id_data is known and that the page is not already write-available, in which case an error is returned to the task manager 2. Hereinafter the number of consumers associated with the page is decremented. If it reaches 0, the page may be freed and becomes accessible for write-accesses. The list of pending requests is then scanned so as to verify whether a pending task is awaiting a page available for writing at the address addr_page, in which case its request may be acknowledged.

To avoid needlessly waking processors when a task successively requests access rights to several pages, it is possible to put in place "overall" availability requests, that is to say in respect of several pages in a buffer, which are acknowledged only when all the requested pages are available. Such a mechanism makes it possible to process the requests for availability of a task globally rather than sequentially, rendering blocking only the last request Ask_avail of a series, identified by the Last field of the request. At the level of the memory manager 1, the putting in place of this type of request requires a scan of the pending_request list during the processing of the last request Ask_avail having set the Last bit to 1. This includes verifying that no other request Ask_avail of the task id_task has been found wanting and therefore only the task id_task is absent from the queue of pending requests, pending_request. Before being acknowledged, an Ask_avail request will thus have to scan a list of all the pending requests so as to verify whether one of them does not belong to the task sending the request. Without optimization, this time may be very large since if one considers 32 active tasks and up to 16 Ask_avail requests per overall availability request, no fewer than 512 cycles have to be considered. These 512 cycles occur for each of the last Ask_avail requests, as well as during the Send_free and Send_avail requests. Therefore, in order to curb the time penalties associated with managing the data access rights, the scan of this list of pending requests awaiting acknowledgment should be optimized. A first optimization, with no extra silicon cost, is simply to dissociate the queues of the read-requests and write-requests. To accelerate the search still further, it is possible to distinguish the search queues as a function of the task sending the request. The logic necessary for the search for the appropriate search queue to be scanned is then appended. This makes it possible to determine almost instantaneously whether an overall availability request can be acknowledged but does not on the other hand accelerate the processing of the Send_avail and Send_free requests. To be accelerated, separate availability requests lists should be kept up to date as a function of the data buffer manipulated and the logic for retrieving the appropriate list as a function of a data identifier should be implemented.

The main advantage of the invention described above is to propose an optimized mechanism for sharing buffers between production tasks and consumption tasks that are unsynchronized.

The invention claimed is:

1. A device for managing data buffers in a memory space distributed over a plurality of memory elements, the memory space being allocatable by memory pages, each buffer comprising one or more of the memory pages, the buffers being usable by at least one processing unit for the execution of an application, the application being executed by a plurality of processing units executing tasks in parallel, the memory elements being accessible in parallel by the processing units, said device comprises:
   a task manager for allocating tasks to the processing units;
   a memory manager module comprising a buffer allocator configured to allocate buffers to tasks during the execution of the application, said buffer allocator being configured to allocate the buffers to tasks depending on a fill state of the buffers and to minimize a maximum number of buffers allocated to a same memory element; and
   a manager module configured to manage access rights to the buffers wherein the manager module is configured to manage access rights to the pages in a given buffer by verifying that writing to a given page does not modify data currently being read from said page or that reading from a given page does not access data currently being written to said page, to share said given buffer between unsynchronized tasks, and
   wherein said buffer allocator includes one or more memory page fill state registers, information in each memory page fill state register characterizing an empty state or a non-empty state of the given memory pages or memory elements, said buffer allocator being further configured to apply one or more bitwise Boolean logic operations to the information in said memory page fill state registers to accelerate an updating of the memory element fill state registers.

2. The device as claimed in claim 1, wherein a given bit in a given memory page fill state register characterizes the empty state or the non-empty state of a given memory page, and wherein the buffer allocator further includes memory element gap state registers, the information in each of the memory element gap state register characterizing a partially full state or a not partially full state of a given memory element.

3. The device as claimed in claim 2, wherein said logic operations include
   AND type on the memory page fill state registers, to accelerate the updating of memory element fill state registers.

4. The device as claimed in claim 3, wherein each memory page fill state register includes bits, a given bit in each memory page fill state register characterizing the empty state or non-empty state of a given memory page, and wherein the buffer allocator further includes a priority encoder to determine in a single cycle the first bit at one in the memory element fill state registers and memory element gap gap state registers.

5. The device as claimed in claim 1, further comprising:
   a buffer deallocator configured to deallocate buffers during the execution of the application, wherein
      the physical addresses of the data contained in a buffer are variable if said buffer is deallocated and then reallocated in the course of the execution of the application,
      the processing unit uses invariable virtual addresses to execute the application, and
      the device further comprises a translator configured to translate the virtual addresses into physical addresses.

6. The device as claimed in claim 5, wherein the translator includes at least one storage structure for storing correspondences between virtual addresses and physical addresses.

7. The device as claimed in claim 6, wherein the correspondences between the virtual addresses and the physical addresses of the data contained in the given buffer are stored in one or more storage structures dedicated to said given buffer.

8. The device as claimed in claim 6, wherein copies of the storage structures are included in each processing unit.

9. The device as claimed in claim 1, wherein the manager module is further configured to verify that a given task is authorized to write data to the given buffer.

10. The device as claimed in claim 1, wherein the manager module is further configured to verify that the number of tasks reading from a given buffer does not exceed a predefined threshold.

11. The device as claimed in claim 1, wherein the manager module is further configured to withdraw from a task the right to write to a buffer and for authorizing another task to write to said buffer.

12. The device as claimed in claim 1, wherein the buffer allocator is further configured to verify that the available memory space is sufficient to allocate a given buffer.

13. The device as claimed in claim 1, wherein the buffer allocator and the manager module are configured to allocate to a given task several pages in the given buffer in a single allocation request.

14. The device as claimed in claim 1, wherein said memory manager module is further configured to place each buffer in the memory space, for each set of pages of the buffer comprising a predefined number of pages, based upon a search for an empty memory space and:
- if an empty memory space is found, the device configured to assign each of the pages of said empty memory space to said set of pages of the buffer,
- if no empty memory space is found, the device configured to separately place each page of said set of pages of the buffer in a free page of a not entirely full portion of the memory space.

15. The device as claimed in claim 14, wherein said information comprised in each memory element gap state register in the buffer allocator includes bits, and wherein the logic operations include exclusive OR type operations on the memory page fill state registers to accelerate updating of the memory element gap state registers.

16. The device as claimed in claim 1, wherein said information comprised in each memory page fill state register includes bits, and wherein a given bit in each memory page fill state register characterizes the empty state or non-empty state of a given memory page.

* * * * *